Figure 1:
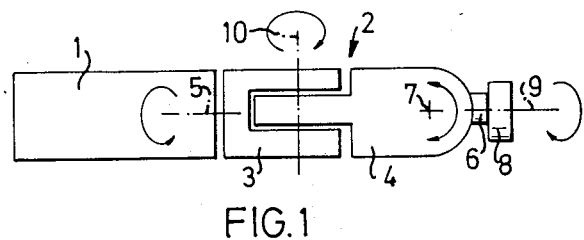

United States Patent [19]

Allared

[11] Patent Number: 4,704,065
[45] Date of Patent: Nov. 3, 1987

[54] WRIST FOR AN INDUSTRIAL ROBOT

[75] Inventor: Carl-Axel Allared, Västerås, Sweden

[73] Assignee: Asea AB, Västerås, Sweden

[21] Appl. No.: 770,272

[22] Filed: Aug. 28, 1985

[30] Foreign Application Priority Data

Aug. 31, 1984 [SE] Sweden ................................ 8404368

[51] Int. Cl.$^4$ .............................................. B25J 17/02
[52] U.S. Cl. ................................. 414/735; 74/665 A; 74/665 D; 901/26; 901/28
[58] Field of Search ..................... 414/735; 901/26, 28, 901/29; 74/665 A, 665 D

[56] References Cited

U.S. PATENT DOCUMENTS

| | | | |
|---|---|---|---|
| 4,229,136 | 10/1980 | Panissidi | 901/29 |
| 4,283,764 | 8/1981 | Crum et al. | 901/28 |
| 4,627,786 | 12/1986 | Minematsu et al. | 901/29 X |

FOREIGN PATENT DOCUMENTS

| | | | |
|---|---|---|---|
| 0085307 | 8/1983 | European Pat. Off. | 901/29 |
| 0108569 | 5/1984 | European Pat. Off. | 901/29 |
| 2102763 | 2/1983 | United Kingdom | 901/29 |

*Primary Examiner*—Frank E. Werner
*Assistant Examiner*—Donald W. Underwood
*Attorney, Agent, or Firm*—Watson, Cole, Grindle & Watson

[57] ABSTRACT

A wrist for an industrial robot with a movable arm is arranged at the outer end of the robot arm and comprises partly a first housing mounted at the end of the arm and journalled for rotation about a first axis which is substantially parallel with the longitudinal axis of the outer part of the arm; partly a second housing journalled in the first housing for pivoting about a second axis which is substantially perpendicular to the axis of rotation of the first housing; partly a tool holder journalled in the second housing for rotation about a third axis which is substantially perpendicular to the second axis; and partly drive and power transmission devices for generating motion in the first and the second housing as well as in the tool holder about the first, the second and the third axis, respectively. The first housing comprises two interconnected sections which are pivotable in relation to each other about a fourth axis extending substantially perpendicularly both to the first axis and to the second axis.

1 Claim, 2 Drawing Figures

U.S. Patent   Nov. 3, 1987   4,704,065

WRIST FOR AN INDUSTRIAL ROBOT

The present invention relates to a wrist for an industrial robot having a movable arm, said wrist being arranged at the outer end of the robot arm and comprising partly a first housing mounted at the end of the arm and journalled for rotation about a first axis which is substantially parallel with the longitudinal axis of the outer part of the arm; partly a second housing journalled in the first housing for pivoting about a second axis which is substantially perpendicular to the axis of rotation of the first housing; partly a tool holder journalled in the second housing for rotation about a third axis which is substantially perpendicular to the second axis; and partly drive and power transmission means for generating motion in the first and the second housing as well as in the tool holder about the first, the second and the third axis, respectively.

In an industrial robot it must be possible to place a holder or an attachment for a tool or a workpiece, disposed farthest out on the robot arm, in any arbitrary position within the working range of the robot, the holder simultaneously being settable in any arbitrary direction. For enabling the holder to assume an arbitrary position in space, there are required three degrees of freedom, and in order for the holder to be arbitrarily oriented there are required three additional degrees of freedom. Accordingly, six independent degrees of freedom will be necessary for the holder to be arbitrarily positioned and oriented.

For orienting the tool holder on the wrist of the industrial robot there is required, as set forth above, three degrees of freedom for the wrist, and this demand is fullfilled with a wrist of the type defined in the introduction. There are however certain problems associated with one or some of the setting positions of the tool holder, and these problems arise when two or more axes in the wrist become parallel, or coincide. Such positions are called singular points, signifying that the tool holder cannot be reoriented in a critical direction without also having to perform a major reorientation of other parts of the wrist. The result will be a time lag, and in continuous processes such as arc welding or gluing, for example, the process has to be interrupted because of the immobility of the tool holder during the time it takes to reorient the wrist. This reorientation may further result in a certain displacement of the tool due to the mechanical tolerances in the wrist, thereby decreasing the positioning accuracy. Another drawback is that the reorientation of the wrist may cause a component to be displaced so far that it collides with parts located adjacent the robot.

The object of the present invention is to provide a wrist of the type defined in the introduction and by which the above-described disadvantages are overcome while affording an improved orienting capacity. This is achieved according to the invention primarily in that the first housing is designed in the form of two interconnected sections which are pivotable in relation to each other about a fourth axis extending substantially perpendicular both to the first and to the second axis.

Figure 2:
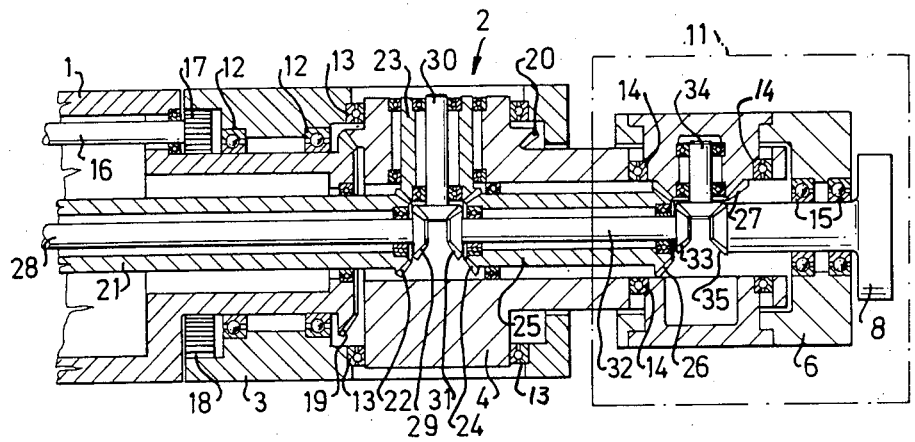

The invention will be described in more detail below with reference to the accompanying drawing in which FIG. 1 is a schematic view of the construction of a wrist according to one embodiment of the invention, and FIG. 2 is a cross section through a wrist designed in accordance with the invention.

FIG. 1 illustrates schematically the outer part of an arm 1 for an industrial robot, as well as a wrist 2 according to the invention affixed to the outer end of the arm 1. The wrist 2 includes a first housing built up of two sections 3 and 4, of which the section 3 is rotatably journalled on the arm 1 for rotation about a first axis 5 which is substantially parallel with the longitudinal axis of the arm 1. The section 4 of the first housing carries a second housing 6 journalled in the housing section 4 for pivoting about a second axis 7 which is substantially perpendicular to and intersects the first axis 5. The second housing 6 in turn carries a tool holder 8 journalled in the second housing 6 for rotation about a third axis 9 which is substantially perpendicular to and intersects the second axis 7.

In accordance with the invention, the two sections 3 and 4 of the first housing are rotatably interconnected for rotation about a fourth axis 10 intersecting the first axis 5 and extending perpendicularly both to the first axis 5 and the second axis 7. In this manner the singular point is avoided which would otherwise have been present in the event of coinciding axes 5 and 9, and which would have given rise to the drawbacks mentioned by way of introduction.

FIG. 2 illustrates a practical embodiment of a wrist according to the invention, constructed as shown schematically in FIG. 1. For the sake of clarity, the wrist portion surrounded by a dash-dotted line 11 has been turned 90° about the longitudinal axis of the wrist.

As can be seen in FIG. 2, the section 3 of the first housing is journalled for rotation at the outer end of the arm 1 via two bearings 12, whereas the section 4 of the first housing is journalled for turning in the section 3 via two bearings 13. The second housing 6 is journalled for turning in the section 4 via two bearings 14, whereas the tool holder 8 is rotatably journalled in the second housing 6 via two bearings 15.

The drive for the various components included in the wrist 2 is also shown in FIG. 2, and it should be observed in this context that in the illustrated embodiment, for the purpose of simplifying the drive means, the rotary motion of the section 3 of the first housing has been coordinated with the interrelated pivotal movement between the sections 3 and 4 of the first housing. In this manner both these movements will be executed by means of a drive shaft 16 having a pinion 17 which is in engagement with a toothed rim 18 on the section 3. In addition, a bevel gear 19, affixed to the arm 1, is in engagement with a bevel gear 20 on the section 4, with the result that rotation of the section 3 will simultaneously cause the section 4 to turn in relation to the section 3.

The drive for turning the second housing 6 in relation to the first housing of sections 3 and 4 is performed by means of a shaft 21 extending through the arm 1 and being in engagement with a shaft 25 via bevel gears 22, 23 and 24, said shaft 25 driving a bevel gear 27 in the second housing 6 via a bevel gear 26.

The tool holder 8 is in turn driven by means of a shaft 28 which is arranged inside the shaft 21 and which drives a bevel gear 35 on the tool holder 8 via bevel gears 29, 30, 31, an intermediate shaft 32 and bevel gears 33 and 34.

With the drive means described above, it will be possible for the various wrist motions to be driven with the aid of the three drive shafts 16, 21 and 28, that is without any additional number of drive shafts, as compared to the type of wrists previously known.

The invention is of course not restricted to the aforedescribed exemplary embodiment but may be subjected to modifications within the scope of the following claims.

I claim:

1. A wrist for an industrial robot having a movable arm, said wrist adapted to be arranged at the outer end of the robot arm, the wrist comprising a first housing mounted at the end of the arm and journalled for rotation about a first axis which is substantially parallel with the longitudinal axis of the outer end of the arm; a second housing journalled in the first housing for pivoting about a second axis which is substantially perpendicular to the axis of rotation of the first housing; a tool holder journalled in the second housing for rotation about a third axis which is substantially perpendicular to the second axis; the first housing comprising interconnected first and second housing sections which are pivotable in relation to each other about a fourth axis extending substantially perpendicularly both to the first axis and to the second axis; said first section being capable of rotation by means of a drive shaft in the arm, the arm having a fixed bevel gear for engagement with a bevel gear on the second section for pivoting the second section in response to the rotation of the first section; and drive and power transmission means for generating movements of the first and the second housing as well as of the tool holder about the first, the second and third axis, respectively.

* * * * *